(12) United States Patent
Reves

(10) Patent No.: US 9,467,462 B2
(45) Date of Patent: Oct. 11, 2016

(54) TRAFFIC ANOMALY ANALYSIS FOR THE DETECTION OF ABERRANT NETWORK CODE

(75) Inventor: Joseph P. Reves, Colorado Springs, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2182 days.

(21) Appl. No.: 11/227,763

(22) Filed: Sep. 15, 2005

(65) Prior Publication Data

US 2007/0064617 A1   Mar. 22, 2007

(51) Int. Cl.
  *H04J 3/14* (2006.01)
  *H04L 29/06* (2006.01)

(52) U.S. Cl.
  CPC ......... *H04L 63/1425* (2013.01); *H04L 63/14* (2013.01); *H04L 63/145* (2013.01); *H04L 63/1408* (2013.01); *H04L 63/1416* (2013.01); *H04L 63/1441* (2013.01)

(58) Field of Classification Search
  CPC ............. H04L 63/145; H04L 63/1441; H04L 63/1416; H04L 63/10; H04L 63/20; H04L 63/08; H04L 63/1433; H04L 67/02; H04L 63/1408; H04L 63/1466; H04L 63/0876; H04L 63/0884; H04L 63/1425; H04L 63/14; G06F 21/566; G06F 21/56; G06F 2221/033; G06F 21/562; G06F 2221/034; G06F 21/552; G06F 21/568; G06F 21/577; G06F 21/554
  USPC ...... 726/22, 23, 24; 713/181, 200, 201, 224; 709/223, 224, 225
  See application file for complete search history.

(56) References Cited

U.S. PATENT DOCUMENTS

| | | | |
|---|---|---|---|
| 5,315,580 A | 5/1994 | Phaal | |
| 6,182,022 B1* | 1/2001 | Mayle et al. | 702/182 |
| 6,671,811 B1 | 12/2003 | Diep et al. | |
| 6,894,972 B1 | 5/2005 | Phaal | |
| 2004/0054925 A1* | 3/2004 | Etheridge et al. | 713/201 |
| 2004/0103159 A1 | 5/2004 | Williamson et al. | |
| 2004/0199791 A1 | 10/2004 | Poletto et al. | |
| 2004/0199793 A1 | 10/2004 | Wilken et al. | |
| 2004/0205374 A1 | 10/2004 | Poletto et al. | |
| 2004/0215975 A1 | 10/2004 | Dudfield et al. | |
| 2005/0033989 A1 | 2/2005 | Poletto et al. | |
| 2005/0210533 A1* | 9/2005 | Copeland et al. | 726/23 |
| 2006/0034305 A1* | 2/2006 | Heimerdinger et al. | 370/408 |

(Continued)

OTHER PUBLICATIONS sFlow.org, "sFlow & Benefits", 2004, http://www.sFlow.org.
Phaal, Peter, and Levine, Marc, "sFlow Version 5", Jul. 2004, http://www.sflow.org.

(Continued)

*Primary Examiner* — Asad Nawaz
*Assistant Examiner* — Najeebuddin Ansari
(74) *Attorney, Agent, or Firm* — The Law Office of Jessica Costa PC

(57) ABSTRACT

A method for detecting nodes in an enterprise network infected with aberrant code is presented in which traffic conversation information representative of traffic conversation in the enterprise network over an analysis period is obtained. Analysis of the obtained traffic conversation information identifies suspected infected nodes in the enterprise network that exhibit behavior outside of the normal behavior associated with the one or more traffic conversation factors. Anomaly analysis may be performed on traffic conversation information associated with the suspected infected nodes to identify any existing infected nodes in the enterprise network.

16 Claims, 13 Drawing Sheets

(56) References Cited

U.S. PATENT DOCUMENTS

| | | | |
|---|---|---|---|
| 2006/0053123 A1* | 3/2006 | Ide et al. | 707/100 |
| 2006/0107321 A1* | 5/2006 | Tzadikario | 726/22 |
| 2007/0240207 A1* | 10/2007 | Belakhdar et al. | 726/12 |
| 2010/0199349 A1* | 8/2010 | Ellis | 726/24 |

OTHER PUBLICATIONS

InMon Corporation, "Traffic Server: Complete Network Visibility and Control", http://www.inmon.com/pdf/InMonTSData.pdf, 2003, http://www.inmon.com/pdf/InMonTSData.pdf.

* cited by examiner

| SOURCE HOST | DESTINATION HOST | FRAMES | BYTES | SOURCE PORT | DESTINATION PORT | PROTOCOL |
|---|---|---|---|---|---|---|
| XXX.XXX.XXX.XXX | YYY.YYY.YYY.YYY | <NUMBER> | <NUMBER> | <PORT #> | <PORT #> | <TCP\|UDP> |
| XXX.XXX.XXX.XXX | YYY.YYY.YYY.YYY | <NUMBER> | <NUMBER> | <PORT #> | <PORT #> | <TCP\|UDP> |
| XXX.XXX.XXX.XXX | YYY.YYY.YYY.YYY | <NUMBER> | <NUMBER> | <PORT #> | <PORT #> | <TCP\|UDP> |
| XXX.XXX.XXX.XXX | YYY.YYY.YYY.YYY | <NUMBER> | <NUMBER> | <PORT #> | <PORT #> | <TCP\|UDP> |
| XXX.XXX.XXX.XXX | YYY.YYY.YYY.YYY | <NUMBER> | <NUMBER> | <PORT #> | <PORT #> | <TCP\|UDP> |
| XXX.XXX.XXX.XXX | YYY.YYY.YYY.YYY | <NUMBER> | <NUMBER> | <PORT #> | <PORT #> | <TCP\|UDP> |
| XXX.XXX.XXX.XXX | YYY.YYY.YYY.YYY | <NUMBER> | <NUMBER> | <PORT #> | <PORT #> | <TCP\|UDP> |
| XXX.XXX.XXX.XXX | YYY.YYY.YYY.YYY | <NUMBER> | <NUMBER> | <PORT #> | <PORT #> | <TCP\|UDP> |
| XXX.XXX.XXX.XXX | YYY.YYY.YYY.YYY | <NUMBER> | <NUMBER> | <PORT #> | <PORT #> | <TCP\|UDP> |
| XXX.XXX.XXX.XXX | YYY.YYY.YYY.YYY | <NUMBER> | <NUMBER> | <PORT #> | <PORT #> | <TCP\|UDP> |

FIG. 4

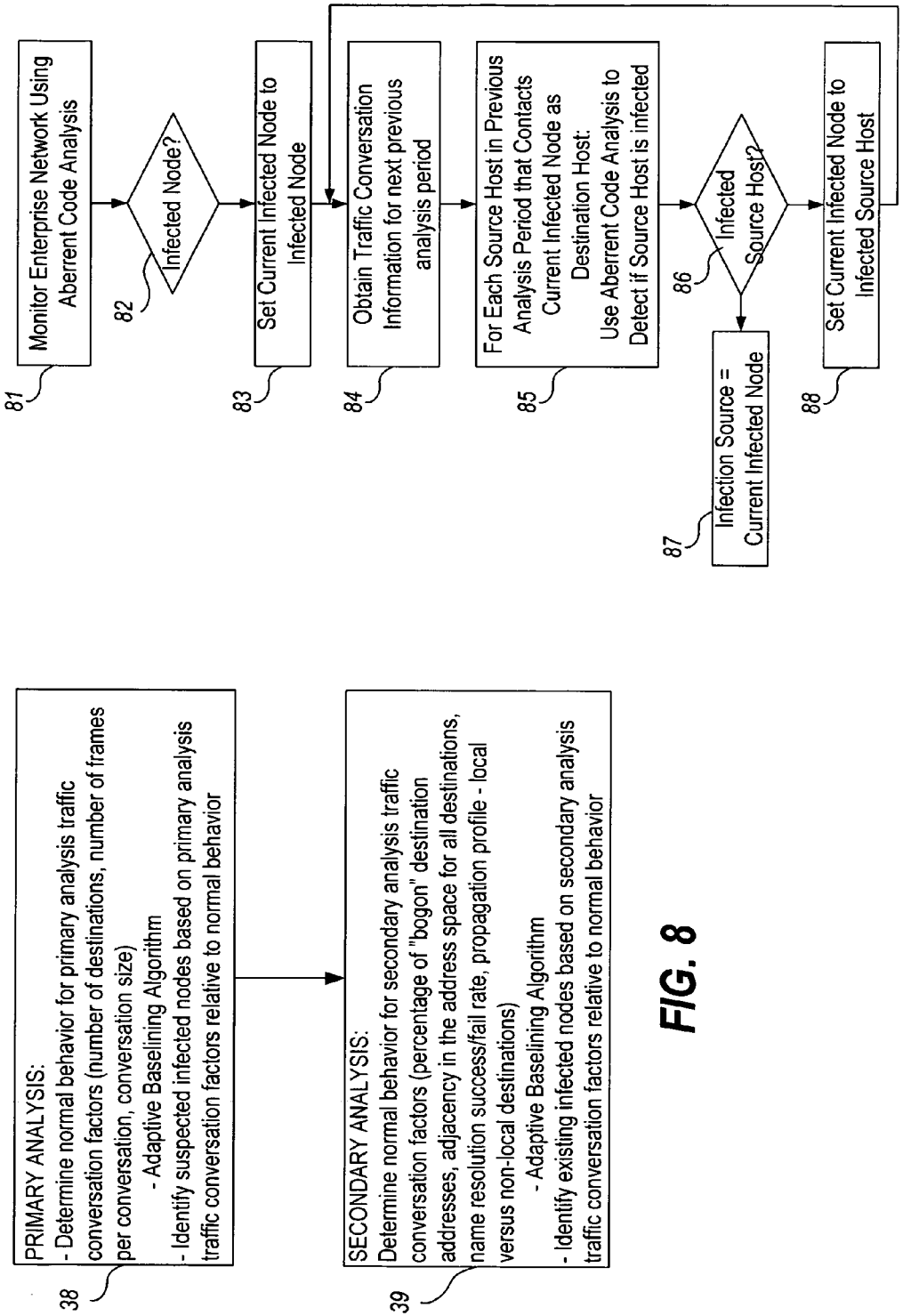

TRAFFIC ANOMALY ANALYSIS FOR THE DETECTION OF ABERRANT NETWORK CODE

BACKGROUND OF THE INVENTION

The present invention relates generally to computer networks, and more particularly to techniques for detecting the presence of aberrant code in a computer network.

The increasing reliance upon computer systems to collect, process, and analyze data makes computer network security and performance ever more important. One aspect of network security relates to what is referred to herein as "malicious code"—a set of computer instructions that perform a function unauthorized by the user. Malicious code appears in various forms, including viruses, worms, and Trojan horses. As used herein, the term "virus" refers to a computer program that can infect other computer programs by modifying them in such a way as to include a (possibly evolved) copy of itself, the term "worm" refers to a self-contained program that self-propagates and distributes complete (possibly modified) copies of itself without requiring a host program in order to survive, and the term "Trojan horse" refers to a complete computer program unto itself that purports to do one thing, but in reality does another and is usually consciously installed and launched by the unaware user. A Trojan horse can contain a worm or a program with a virus.

Malicious code typically exploits vulnerabilities in a network to self-propagate through the network to infect machines, or "nodes", connected to the network, causing damage generated by the data payload and increasing the consumption of network bandwidth to the detriment of the performance of the network and infected network nodes in performing legitimate operations. Malicious code propagates most efficiently by attacking commonly used services on common network hosts. This means that, by definition, malicious code is traveling over the very services that most commonly appear on the network.

There are three basic techniques commonly available to detect the presence of malicious code propagating through a network, namely, "signature analysis", "active host probing", and "anomaly analysis". Signature analysis is the most popular conventional approach to detecting malicious code and is based upon capturing and analyzing traffic and comparing it to known malicious code propagation signatures.

In order for signature analysis to be effective, malicious code must be rapidly detected and its signatures captured and distributed to the signature analysis systems remote sensors performing the analysis. However, the response time for discovering and distributing new signatures will always lag behind the introduction of new malicious code, often long after significant damage has already been done. Also, signature based systems require that traffic be captured and examined at the speed of the media for a match on a signature in the signature library, possibly archiving traffic when a signature match is triggered. This requires some substantial local processing power on Local Area Network (LAN) infrastructures and provides an incentive to deploy sensors only at the perimeter, and only over Wide Area Network (WAN) links, which are slower than LAN links due to typically slower instrumentation, higher traffic, and longer distance for transmission to destination.

The instrumentation required for signature analysis is dedicated, expensive, and should be carefully positioned and integrated to provide the maximum visibility through the enterprise without introducing single points of failure in the connectivity path. "Chokepoints" for network traffic are identified, but gaps in visibility can render the system ineffective. While this type of system is usually deployed at the perimeter of an enterprise network, malicious code is usually introduced into the enterprise from the interior, by mobile users, business partners, or remote access users. With sensors at the perimeter only, the first indication of malicious traffic may be as systems within the enterprise seek targets outside the network.

In active host probing, the host is directly probed or scanned to assess its security posture. More particularly, active host probes either query a client agent running on the host, or attempt to assess responses from direct communications with the host to determine whether it is vulnerable or not.

One form of active host probes are known as Network Access Control (NAC) systems. NAC systems function at the edge of the network, and work by initially limiting network access for a host that is connecting to the network. The NAC system queries a trusted agent on the host that reports on attributes like patch levels, virus definition versions, software firewall rules, etc. Only after comparing the results of the agent query to a network access policy of the local enterprise network may the host be permitted full connectivity to the network. If the host agent responds with inadequate patch levels or outdated virus scanning definitions, the NAC system can permit limited connectivity to the network to access remediation resources such as a patch repository, for example. Non-responsive hosts (e.g., hosts without a local agent) may be refused access, offered limited access, or probed directly for vulnerabilities.

In NAC systems, the network infrastructure includes a policy repository that is available for the entire enabled infrastructure. In addition, network compartments are defined throughout the enterprise to contain remediation resources, or to define limited, "guest" access. For a large, multi-site enterprise network, this is difficult and expensive to implement pervasively. Generally, it is recommended to be implemented in those areas of the topology at the greatest risk such as common "guest" areas, wireless networks, remote access infrastructure, or mobile "hot-desk" environments. A current policy (based upon known vulnerabilities) should be continually updated.

This system also only provides a snapshot of vulnerability assessment. Only when the host initially connects to the network is its security posture evaluated, and network access granted. Hosts which qualify for access today—and remain connected—might not remain compliant with the NAC policy, and could be compromised later with a novel infection. Thus, NAC systems offer only access control; and not ongoing continuous monitoring or evaluation. There is no guarantee that currently connected hosts will not become infected once connected.

There are, however, periodic scanning systems which search subnets, and probe hosts with test suites designed to indicate vulnerability. These systems must be updated with new test suites, also based upon known vulnerabilities, but the advantage is that they can operate continuously to identify newly infected already connected hosts. However, vulnerability scanning systems operate only to report vulnerable systems, and cannot isolate or remediate infected systems.

A third technique for detecting the presence of malicious code is referred to herein as "anomaly analysis". In anomaly analysis, the behavior of the host on the network is analyzed to try to identify "unusual" traffic patterns that may indicate infection. Complete traffic data including entire conversation packets, connection setup packets, and flow data is collected to isolate conversations, which are then analyzed to detect anomalous connections or atypical bandwidth utilization that might indicate unknown attacks, insider misuse, worm propagation, or other malicious activity. Much of the existing work in network traffic anomaly detection revolves around identifying only one impact of malicious code—the consumption of unusually high network bandwidth. This is not a characteristic of all malicious code, but it is a relatively simple characteristic to detect. Other published algorithms for anomaly detection may include the analysis of connections to "unusual" destination ports, the analysis of attempted connections to systems that do not exist, and detection of protocol anomalies (i.e., traffic conversation behavior that may not be compliant with published specifications for a particular protocol). Clearly, the disadvantage of protocol anomaly detection is the requirement of pervasively deployed "promiscuous" instrumentation for decoding every packet in the conversation, which is very expensive.

Anomaly detection systems require pervasive and detailed traffic characterization information in order to construct a "normal" behavioral model. This presents many of the same problems that face signature based detection systems. In order to construct an accurate picture of traffic flows and volumes, collection devices are deployed through the network infrastructure. These devices are run at the speed of the media (i.e., keep up with high-speed LAN traffic without missing any packets), and an enormous volume of data must be rapidly correlated through the enterprise, eliminating duplicate conversations that may be visible to multiple collectors. Both near-real time data, and historical data should be available, to provide timely detection of new anomalies, and to support the analysis of unusual behaviors over extended periods of time.

Because it has been historically difficult to visualize enterprise-wide traffic flow information pervasively, it is difficult to identify and analyze patterns in the overall traffic conversation. The common approaches to anomaly analysis are plagued by high rates of false positives for detecting malicious code because they infer malicious behavior from indirect indications such as traffic volumes.

In summary, the above-identified techniques for detecting the presence of malicious code in nodes of an enterprise network have been limited by the technologies available for network monitoring. Historically available technologies have focused on detailed, promiscuous monitoring at specific chokepoints, and have generated extremely large data sets of monitoring information that are virtually impossible to correlate across an enterprise network.

Accordingly, a need exists for a technique for reliably separating and identifying malicious network code from benign, normal application code, and to do so without having to examine every packet transmitted in the network. Furthermore, a need exists for a malicious code detection technique that does not require knowledge of malicious code signatures.

So far, discussion has been focused on a particular type of code, namely "malicious code", which performs unauthorized functions resulting in poor network performance. However, more generally, network performance may be negatively impacted by any type of code that utilizes network communication which negatively affects the performance of the network, whether introduced intentionally or unintentionally (for example, inadvertent results of a program due to poor programming). Some of the techniques used in the detection of malicious code (especially, for example, anomaly analysis), may be applied in attempting to detect the more general "aberrant" code. However, in order to determine what is and is not "aberrant", one needs a "normal" network traffic reference point from which to compare existing network traffic. None of the above described techniques for use in detecting malicious code generate a baseline of "normal" network behavior from the network traffic itself that would allow detection of aberrant behavior.

Accordingly, a need also exists for a technique for identifying aberrant network traffic behavior from normal benign network traffic based only upon the network traffic itself.

SUMMARY OF THE INVENTION

According to a first aspect of the invention there is provided a method for detecting nodes in an enterprise network infected with aberrant code, the method comprising the steps of obtaining traffic conversation information representative of traffic conversation in the enterprise network over an analysis period, determining normal behavior associated with one or more traffic conversation factors from the traffic conversation information, and analyzing the traffic conversation information to identify nodes in the enterprise network that exhibit behavior outside of the normal behavior associated with the one or more traffic conversation factors as suspected infected nodes.

According to a second aspect of the invention, there is provided a method for detecting nodes in an enterprise network infected with aberrant code, the method comprising the steps of: obtaining traffic conversation information representative of traffic conversation in the enterprise network over an analysis period, determining normal behavior associated with one or more of a set of first traffic conversation factors from the traffic conversation information, analyzing the traffic conversation information to identify nodes in the enterprise network that exhibit behavior outside of the normal behavior associated with the one or more of the set of first traffic conversation factors as suspected infected nodes, determining normal behavior associated with one or more of a set of second traffic conversation factors from the traffic conversation information, and analyzing the traffic conversation information associated with the suspected infected nodes to identify any existing infected nodes as suspected infected nodes that exhibit behavior outside of the normal behavior associated with the one or more of the set of second traffic conversation factors as suspected infected nodes.

According to a third aspect of the invention, there is provided a method for detecting nodes in an enterprise network infected with aberrant code, the method comprising the steps of: obtaining traffic conversation information representative of traffic conversations in the enterprise network over an analysis period, determining normal source host behavior associated with one or more traffic conversation factors from the traffic conversation information, analyzing the traffic conversation information to identify nodes in the enterprise network with source hosts that exhibit behavior outside of the normal source host behavior associated with the one or more traffic conversation factors as suspected infected nodes, and analyzing the traffic conversation information associated with the suspected infected nodes for destination characteristics indicative of aberrant code to identify any existing infected nodes.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a table illustrating an exemplary traffic conversation information matrix;

FIG. 8 is a flowchart illustrating an exemplary two-stage analysis for detecting the presence of aberrant code in an enterprise network;

FIG. 14 is a flowchart illustrating an exemplary method for identifying a source of introduction of aberrant code in an enterprise network.

DETAILED DESCRIPTION

The present invention is a technique for detecting nodes of an enterprise network that are infected with aberrant code by analyzing their network traffic conversation characteristics. The technique of the invention operates to identify what is aberrant by observing what is considered normal traffic conversation behavior during a given analysis period over the entire population of nodes in the enterprise network, and then analyzing the behavior of source hosts during the analysis period relative to the normal behavior during this analysis period to identify any "suspected infected" nodes. The infected behavior is then confirmed by analyzing the characteristics of the destination hosts that the "suspected infected" nodes attempt to contact.

The following definitions apply herein:

"network"—a set of hosts that are able to communicate with each other;

"enterprise network"—a network or subset of a network, typically, but not necessarily, under common administrative control, typically supporting a specific, bounded enterprise;

"aberrant code"—a set of computer instructions that results in network traffic behavior outside the normal network traffic behavior and which may (intentionally or unintentionally) negatively impact the performance of a network or a node of a network;

"malicious code"—a set of computer instructions that perform a function unauthorized by the user;

"node"—network junction or connection point that may transmit, receive, and/or pass on network communication packets;

"network communication packet"—a block of data transmitted with a header containing routing information including at least a source address and a destination address;

"host"—a network node, able to receive and transmit network messages;

"service"—a software application provided by a host that provides information and/or results in one or more actions;

"server"—software that performs a service; "client"—software that requests performance of a service by a server;

"port"—attachment point for a network connection;

"datagram"—a packet comprising a network communication packet or information derived from a network communication packet;

"frame"—a fixed block of data transmitted as a single entity;

"bogon"—an Internet Protocol (IP) packet on the public Internet that claims to be from an area of the IP address space reserved, but not yet allocated or delegated by the Internet Associated Numbers Authority (IANA) or a delegated Internet registry;

"infected"—exhibiting aberrant behavior, whether authorized or unauthorized by the user.

Figure 1:
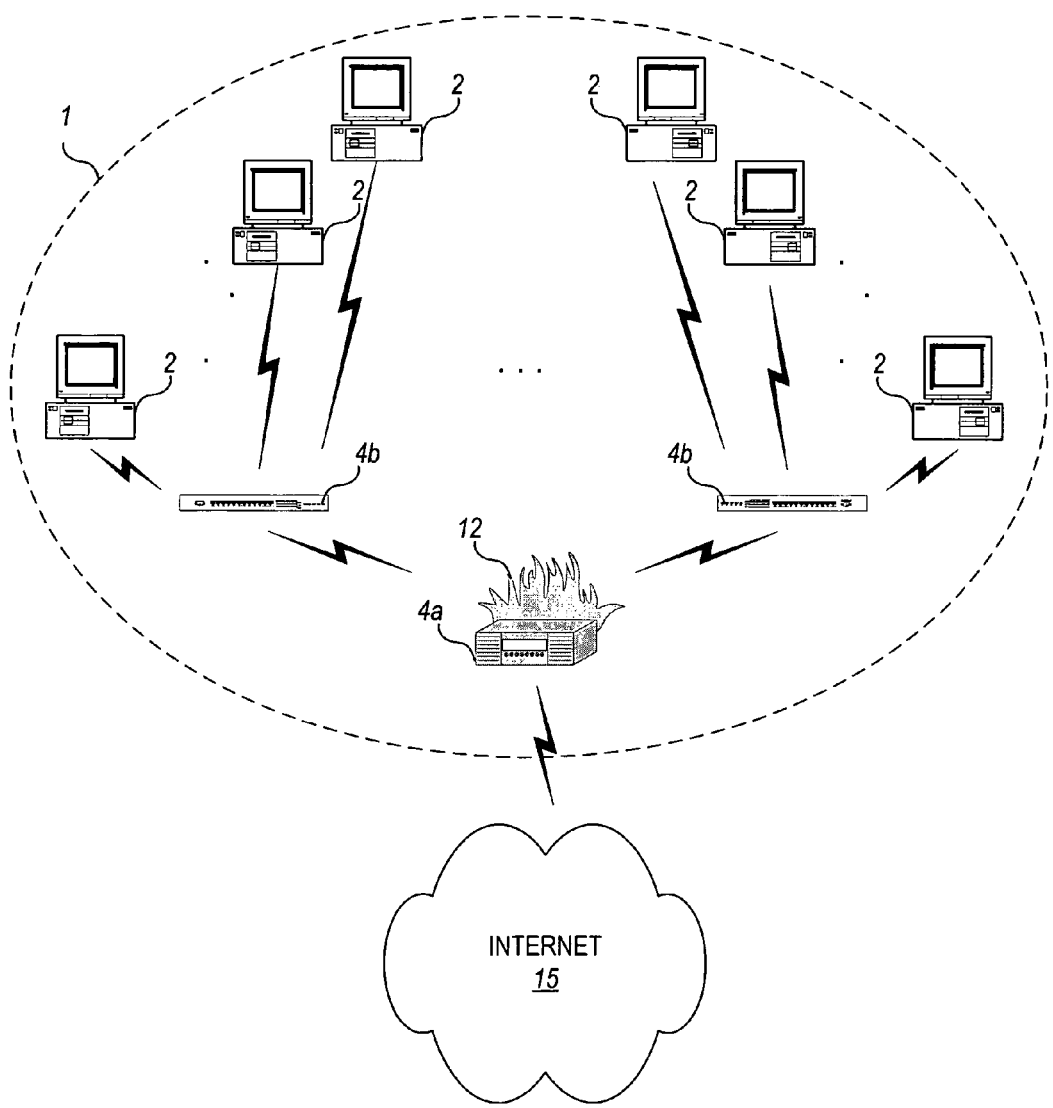
FIG. 1 is a network diagram illustrating an enterprise network in accordance with the invention.

Turning now to the drawings, FIG. 1 illustrates an example enterprise network 1 comprising a given collection of computerized network nodes 2 that may communicate with one another via network communication packets. In the preferred embodiment, the network communication packets are Internet Protocol (IP) packets, but may be otherwise variously embodied, for example using System Network Architecture (SNA) packets or other standardized or customized packet protocols. The enterprise network 1 may receive network communication packets generated by source nodes within the enterprise network 1 destined for destination nodes within the enterprise network 1. Alternatively, or in addition, the enterprise network 1 may receive network communication packets from sources outside the enterprise network passed over the Internet 15. Traffic from the Internet 15 may pass through a firewall 12 before entering the enterprise network 1. Traffic may be routed by one or more routers 4a to one or more distribution switches 4b, providing connectivity to the computers (nodes 2) within the enterprise network 1.

Figure 2:
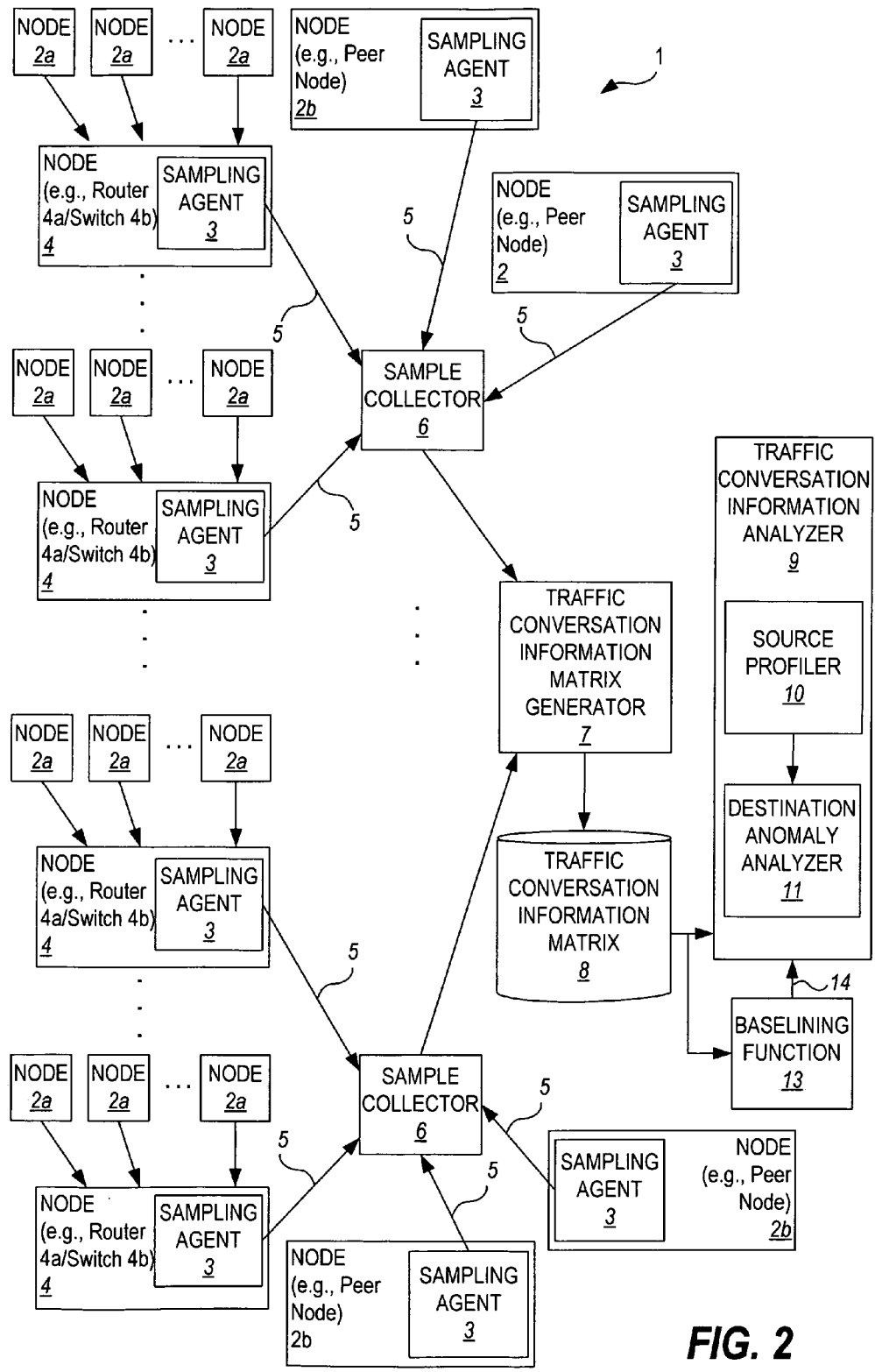
FIG. 2 is a block diagram of an enterprise network implemented in accordance with the invention.

FIG. 2 illustrates a more detailed diagram of an exemplary preferred embodiment of the enterprise network 1 which allows detection of aberrant code in accordance with the invention. As shown, the enterprise network 1 comprises a plurality of network nodes 2a, 2b, 4. The nodes may be one or more of a source host from which network communication packets originate, a destination host to which network communication packets are addressed, and an intermediate node 4 such as routers 4a or switches 4b through which network communication packets travel. Network communication packets, hereinafter also referred to as "traffic data", originating from, destined to, or passing through, each of the nodes 2a, 2b, 4 in the enterprise network 1 are sampled by one or more sampling agents 3. A sampling agent 3 generally operates to collect information from a network communication packet on a periodic basis, for example, 1 out of every N packets, preferably using a frame-based sampling approach.

The sampling agents 3 collect traffic data samples representing the traffic conversation over the entire enterprise network. In the preferred embodiment, the sampling agents 3 are embedded within, and execute within, key network nodes 4 that include all routers 4a and switches 4b and any other node 2 through which traffic must be routed to complete any source-to-destination communication path. The number and locations of the sampling agents 3 may therefore vary depending on the configuration of the nodes within the enterprise network 1.

For example, as shown in FIGS. 1 and 2, many nodes 2a communicate with one another only through intermediate routers 4a and switches 4b. These nodes are referred to herein as "end nodes". In this case, sampling agents 3 need not be implemented at the end nodes 2a since all of their traffic by necessity goes through the routers 4a/switches 4b. Thus, it is sufficient to implement a sampling agent 3 only at the routers 4a/switches 4b through which traffic between end nodes may travel.

In other cases, nodes 2b may be configured to communicate directly with one another in a peer-to-peer fashion (for example, in a system with multiple hosts connected within a common chassis, such as a blade system or grid network) without intermediate transmission though routers 4a, switches 4b or other intermediate nodes. These types of nodes 2b, referred to herein as "peer nodes", require some method of sampling at the peer nodes themselves in order to obtain a fair representation of the traffic conversation at these nodes. In the preferred embodiment, sampling agents 3 are therefore embedded within, and execute within, the peer nodes 2b themselves.

As will be appreciated from the above discussion, the number and locations of sampling agents 3 within the enterprise network may be variously configured depending on the layout and communication connections between the nodes in the network. Furthermore, in other embodiments, the sampling agent(s) 3 may not be embedded in any of the nodes themselves but may execute elsewhere and perform queries on one or more of the various nodes throughout the enterprise network 1. However, in order to obtain a fair representation of the traffic through the network, query based sampling will generally include some means in the nodes themselves of keeping track of the number of packets transmitted therefrom, to store sampled packets, and possibly even to notify the query process that a sampled packet is ready for retrieval. In summary, the sampling agents 3 must be implemented and configured to fairly represent the traffic conversation across the entire enterprise network 1 being monitored over an analysis period of interest.

In the exemplary enterprise network of FIG. 2, one or more sample collectors 6 receive sampled network communication packets, or information derived therefrom, herein referred to as "datagrams" 5 from the various sampling agents 3 in the network. The sample collectors 6 send the datagrams 5 to a traffic conversation information matrix generator 7, which compiles all of the sampled traffic into a comprehensive traffic conversation information matrix 8. The traffic conversation information matrix 8 is generated over a predefined analysis period. Once a traffic conversation information matrix 8 is generated from sampled data over the entire enterprise network 1 for the full analysis period, the traffic conversation information matrix 8 is ready to be analyzed, as described hereinafter.

A baselining function 13 receives the traffic conversation information matrix 8 and from the matrix 8, analyzes one or more traffic conversation factors, discussed hereinafter, to parameterize what is considered "normal" traffic conversation to generate a set of "normal" traffic conversation parameters 14.

A traffic conversation information analyzer 9 executes an algorithm, preferably implemented in software on a computer within the enterprise network 1 or on a computer outside the enterprise network 1 (either as a computer able to connect to the enterprise network or a standalone computer), that identifies nodes (nodes 2a, 2b) in the enterprise network 1 that are infected by aberrant code based upon the behavior of traffic conversation information originating from those nodes during the analysis period relative to what is considered "normal" behavior of the traffic conversation information (specified by the "normal" traffic conversation parameters 14 generated by the baselining function 13) over the entire population of nodes in the enterprise network during the analysis period. Preferably, the traffic conversation information analyzer 9 includes a source characteristics profiler 10 which identifies any suspected infected nodes based on characteristics of source hosts executing on the respective nodes (such as attempted contact with a high number of destinations). Preferably, the traffic conversation information analyzer 9 also includes a destination anomaly analyzer 11 which performs anomaly analysis on the characteristics of the destinations that are targeted by source hosts that are identified as "suspected infected" by the source profiler 10.

Fundamentally, in order to accurately identify "normal" versus "anomalous" behavior, the traffic conversation information matrix 8 should be representative of the traffic conversation over the entire population of nodes in the enterprise network during the analysis period. In the preferred embodiment, this is accomplished by using an enterprise-wide traffic frame-based sampling mechanism, which can be performed in realtime at the speed of the communications (so as not to miss any packets), rather than by the conventional correlation of distributed promiscuous sensors.

In the preferred embodiment, the traffic conversation information matrix 8 is generated based upon sampled traffic data provided by sFlow® instrumentation in the network switch fabric. In particular, in the preferred illustrative embodiment, the sampling agents 3 are embedded within the switches and routers by the switch/router vendors and implemented in accordance with the sFlow® specification, published as Internet Engineering Task Force RFC3176. The current sFlow specification is available at sflow.org. Also in the preferred illustrative embodiment, the sample collector(s) 6 are implemented, for example, using InMon® Traffic Server, manufactured by InMon Corporation having headquarters in San Francisco, Calif., Preferably, the sampling agents 3 perform a 1-in-N frame-based sampling (i.e., samples 1 out of every N packets) of Internet Protocol (IP) packets that pass through the switches and routers in the enterprise network. Also in the preferred embodiment, an sFlow® Sampling Agent is implemented to monitor each active port in each switch and router of the enterprise network 1 to ensure representative sampling of all traffic conversation flowing throughout the enterprise network.

The details of the InMon® sFlow® sampling agent and Traffic Server are described in U.S. Pat. No. 6,894,972 to Phaal, entitled "Intelligent Collaboration Across Network System", which is hereby incorporated by reference herein for all that it teaches.

Figure 3:
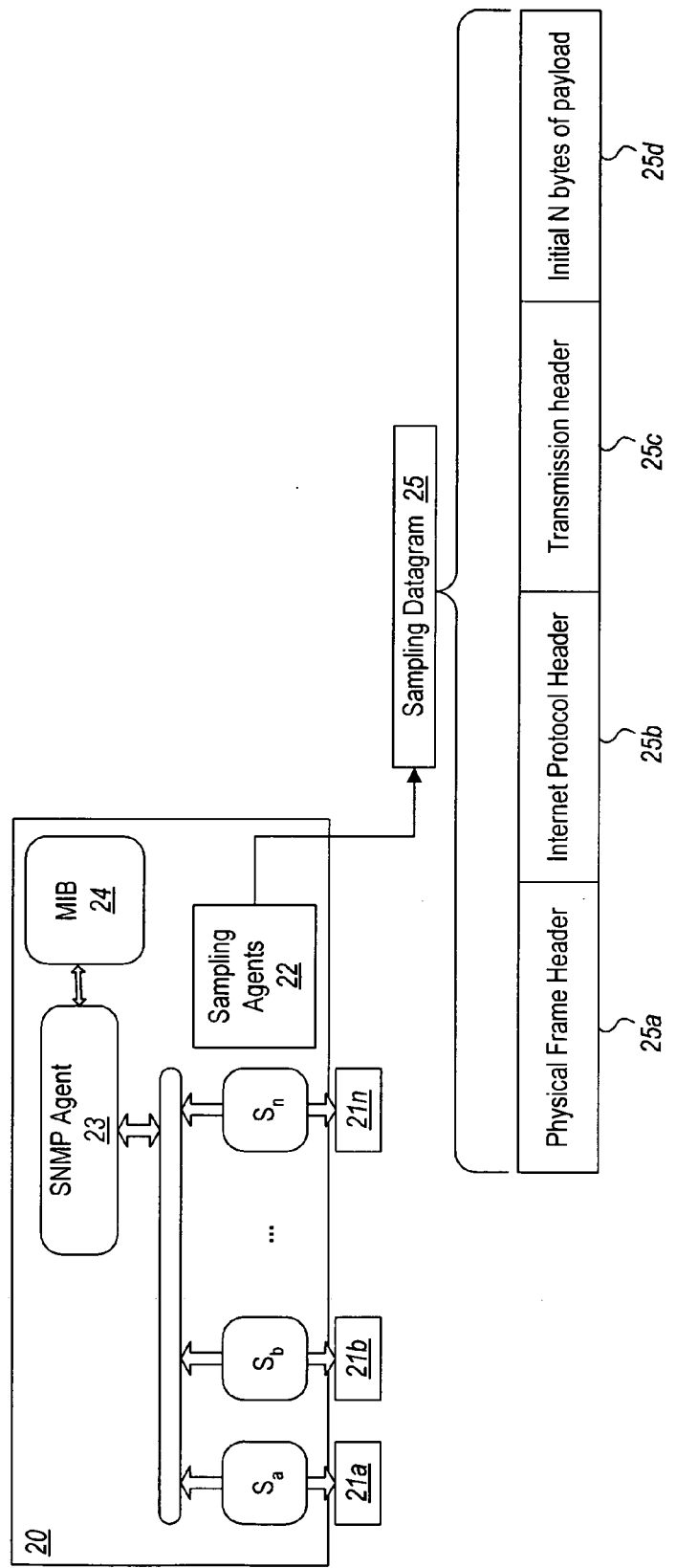
FIG. 3 is a block diagram of a device with an embedded sampling agent.

FIG. 3 is a diagram illustrating an exemplary device 20 (e.g., a switch or router) having a single sFlow® sampling agent 22 coordinating packet samplers $S_a, S_b, \ldots, S_n$ through a Simple Network Management Protocol (SNMP) service 23, for example a NetFlow agent, developed and manufactured by Cisco Systems, Inc., of San Jose, Calif. The SNMP service 23 returns information contained in a Management Information Base (MIB) 24 to control the parameters of the packet samplers $S_a, S_b, \ldots, S_n$. A separate packet sampler $S_a, S_b, \ldots, S_n$ monitors each port $21_a, 21_b, \ldots, 21_n$ of the device 20, which is what provides the embedded visibility to all traffic. The sampling agent 22 builds sampling datagrams 25 from the sampled network communication packets. A sampling datagram 25 preferably contains at least a physical frame header 25a, an Internet Protocol (IP) header 25b, a Transmission Control Protocol (TCP) header 25c, and an initial N bytes of the data payload 25d, which are used by the traffic conversation information matrix generator 7 to construct the traffic conversation information matrix 8.

The contents of the headers 25a, 25b, 25c, are well-known in the art and defined by the protocols used for communication. In the preferred embodiment, the protocol includes the well-known TCP/IP protocol. The IP header 25b includes, among other fields, the source IP address and destination IP address, as well as framing and conversation size information, and the protocol used for the conversation. The TCP header 25c includes, among other fields, the source port and destination port.

FIG. 4 is a table illustrating an example traffic conversation information matrix 40 that may be constructed by the traffic conversation matrix generator 7. As illustrated, the traffic conversation information matrix 40 includes, for each traffic conversation, at least: the source host address 41, the destination host address 42, the number of frames 43, the size of the conversation in bytes 44, the source port 45, the destination port 46, and the protocol 47. Other information may be included depending on what the traffic conversation information analyzer 9 requires for its analysis. At end of analysis period, the traffic conversation information matrix 8, as shown in the example traffic conversation information matrix 40 of FIG. 4, will include an entry for each traffic conversation. The generation of the traffic conversation information matrix 8, or more generally, the collection of the information contained in the traffic conversation information matrix 8, is a fundamentally unique approach in that a picture of the network traffic over the entire enterprise network 1 is captured non-obtrusively and without significantly impacting the performance of the network 1 or the individual nodes 2a, 2b, 4a, 4b in the network 1.

Figure 5:
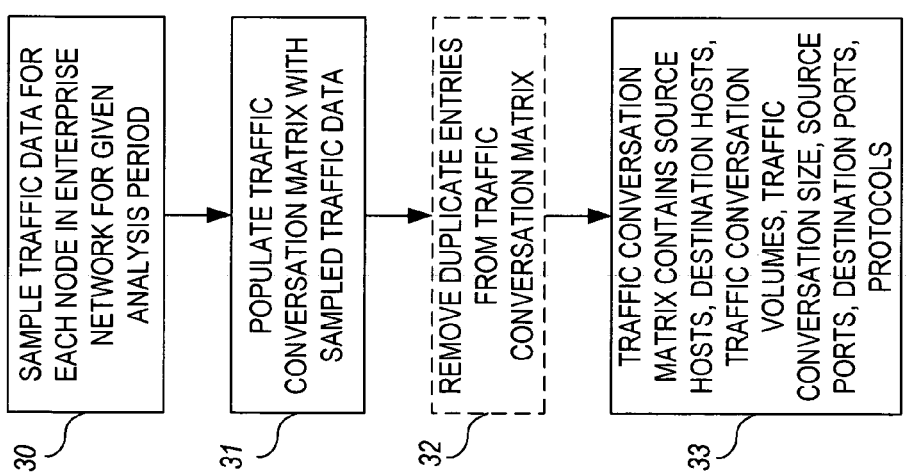
FIG. 5 a flowchart illustrating more generally the method of operation of the traffic conversation information collection mechanism of FIG. 2.

In FIG. 5 there is shown a flowchart illustrating more generally the method of operation of the traffic conversation information collection mechanism performed by the sampling agent(s) 3, sample collector(s) 6, and traffic conversation information matrix generator 7 of FIG. 2. As shown, traffic data is sampled for each node in the entire population of nodes (i.e., in the entire enterprise network 1) over a given analysis period (step 30). A traffic conversation information matrix 8 is populated with information from the sampled traffic data (step 31). Duplicate entries, if they exist, are removed from the matrix 8 (step 32). The final matrix 8 preferably contains the source IP address, the destination IP address, the number of frames, the number of bytes, the source port, the destination port, and the protocol used for the entire analysis period, and is released to the analyzer 9 for analysis (step 33).

Figure 6:
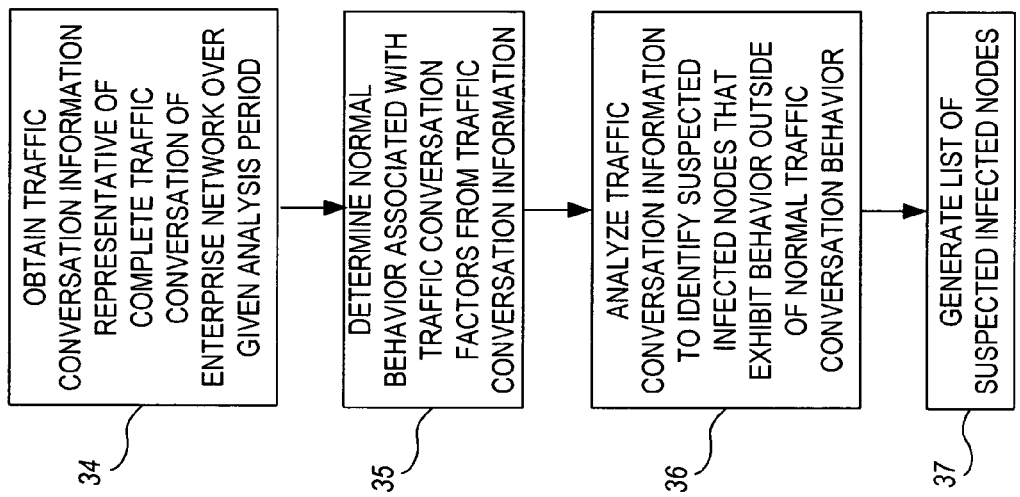
FIG. 6 is a flowchart illustrating an exemplary method for detecting network nodes in an enterprise network that are suspected of being infected with aberrant code.

FIG. 6 illustrates the general technique of the invention for detecting network nodes in an enterprise network that are suspected of being infected with aberrant code. As described above, traffic conversation information representative of the complete traffic conversation throughout the entire enterprise network 1 of nodes is collected over a given analysis period (step 34), for example in a traffic conversation information matrix 40 such as that shown in FIG. 4. Normal behavior associated with one or more traffic conversation factors from the traffic conversation information is then determined from the collected traffic conversation information (step 35), using techniques described hereinafter. The collected traffic conversation information is then analyzed to identify nodes in the enterprise network that exhibit behavior outside of the normal behavior associated with one or more traffic conversation factors as suspected infected nodes (step 36), and a list of the suspected infected nodes is then generated (step 37).

Figure 7:
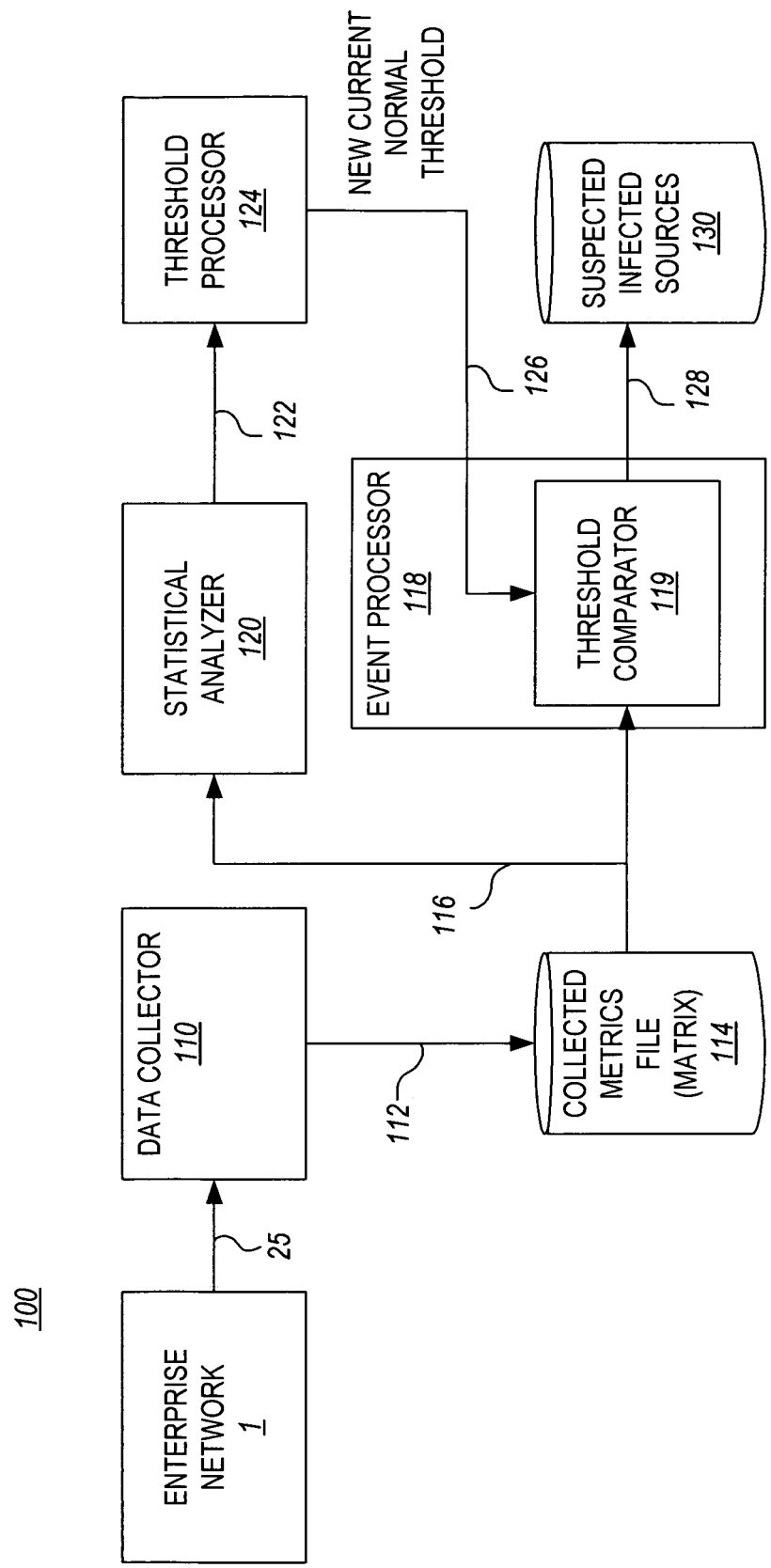
FIG. 7 is a block diagram of an automated adaptive baselining and thresholding system used in the preferred embodiment of the invention for determining "normal" traffic conversation behavior for a given analysis period.

In the preferred embodiment, one technique for determining the normal behavior associated with selected one or more traffic conversation factors from the traffic conversation information is through the use of an automated adaptive baselining and thresholding system 100, shown in FIG. 7, and described in detail in U.S. Pat. No. 6,182,022, to Mayle et al., entitled "Automated Adaptive Baselining And Thresholding Method And System", which is incorporated herein by reference for all that it teaches. The automated adaptive baselining and threshold system 100 of FIG. 7 includes a data collector 110, a threshold comparator 119, a collected metrics file 114, a statistical analyzer 120, a threshold processor 124, and event processor 118. In the preferred embodiment, the data collector 110 is implemented collectively by the sampling agents 3, sample collectors 6, and traffic conversation information matrix generator 7. The data collector 110 extracts metrics (e.g., values) 112 for various attributes of the enterprise network from the sampled traffic conversation and stores them in the collected metrics file 114, which in the present invention is the traffic conversation information matrix 8.

The statistical analyzer 120 periodically retrieves the metrics 116 from the collected metrics file 114 which were collected for one or more given attributes $y_1, y_2, \ldots, y_n$ over time. In particular, after the given analysis period is complete, the traffic conversation information matrix 8 is released to the statistical analyzer 120 for analysis. The statistical analyzer 120 may be implemented using a statistical analysis package, for example, SAS, manufactured by SAS Institute, Inc.

A baseline 122 which represents the normal operating range for the attribute during the analysis period is constructed from the collected metrics associated with the attribute. The extracted metrics are the raw data which representation the baseline 122 of a given attribute y over a sliding window of time T1 (which is the analysis period). The statistical analyzer 120 performs statistical analysis on the raw data to generate a representation of the normal operating range of attribute y during time period T1 (e.g., the mean of attribute y plus or minus one or more standard deviations of y). For example, during the primary analysis, attribute y may be assigned to the number of destinations attempted to be contacted by a source host. The statistical analyzer 120 will extract the number of destinations contacted (or attempted to be contacted) by each source host, determine the mean and standard deviation, and construct a baseline representing the normal operating range for the number of destination hosts contacted (or attempted to be contacted) by each source host.

A threshold processor 124 may perform statistical analysis on the baseline 122 which was constructed for the attribute y by statistical analyzer 120 to generate a new current normal threshold 126 for the attribute. A threshold comparator 119 may compare a metric associated with an attribute for each source in the traffic conversation information matrix 8 to the current normal threshold 126 to determine whether attribute of the corresponding source host is out of "normal" operating range. If so, the threshold processor 124 may add the source host 128 to the list 130 of "suspected infected" source hosts.

Turning now in more detail to the analysis of the collected traffic conversation information, the analysis preferably comprises a two-stage analysis process, shown in FIG. 8. The two-stage analysis includes a primary analysis (step 38), which profiles the characteristics of the source hosts in the traffic conversation information matrix in terms of number of destinations, frame number and byte number variation, and source and target ports. The two-stage analysis also includes a secondary analysis (step 39), which analyzes the characteristics of targets of suspected infected sources for conventional anomalies such as adjacent destination addresses, "bogon" destination addresses, destination name resolution success/fail rate, and propagation profile (local versus non-local destinations).

In the primary analysis (step 38), sources of traffic destined for a particular port and protocol are profiled, based upon the number of destinations contacted over the analysis period. An adaptive baselining function (for example, one implemented according to an adaptive baselining system described in U.S. Pat. No. 6,182,022, to Mayle et al., entitled "Automated Adaptive Baselining And Thresholding Method And System" and incorporated herein by reference for all that it teaches, is applied to identify sources with statistically "unusually large" numbers of destinations, as compared with the entire conversation population for that port and protocol combination. Conversation sizes are also analyzed at this point to identify conversations that are mostly similar in size—that is, the standard deviation of the conversations is low. Suspected infected nodes are ranked based upon this initial analysis.

Suspected infected sources are then subjected to a secondary analysis (step 39) which examines the characteristics of the targeted destination hosts. Several factors are examined, including the percentage of destinations for this source which are "bogons" (defined previously).

Attempts to communicate with bogon destinations are a strong indicator that the source is aberrant code, using a simple and economical algorithm to generate potential targets.

Another indicator that the source host is infected is a high number of destinations for the source that are adjacent in address space for the analysis period. Adjacency indicates simple scanning behavior, searching for potential targets, even if the aberrant code is not scanning sequentially.

Yet another indicator of an infected source host is a high number of "invalid" destinations within the network enterprise. Invalid destinations are named destination hosts whose name cannot be resolved (i.e., translated into an IP address) by the Domain Name Service (DNS), wherein the unresolved destinations are not themselves also sources of traffic. Trying to communicate with inactive hosts also indicates scanning behavior.

In an exemplary embodiment, a threshold value and weighting is assigned to each aberrant code indication factor, and a collective "score" which represents a likelihood of infection is assigned. By using this relative weighting method, resources for mitigation can be directed and prioritized against the most likely infected hosts in the network.

Figure 9A:
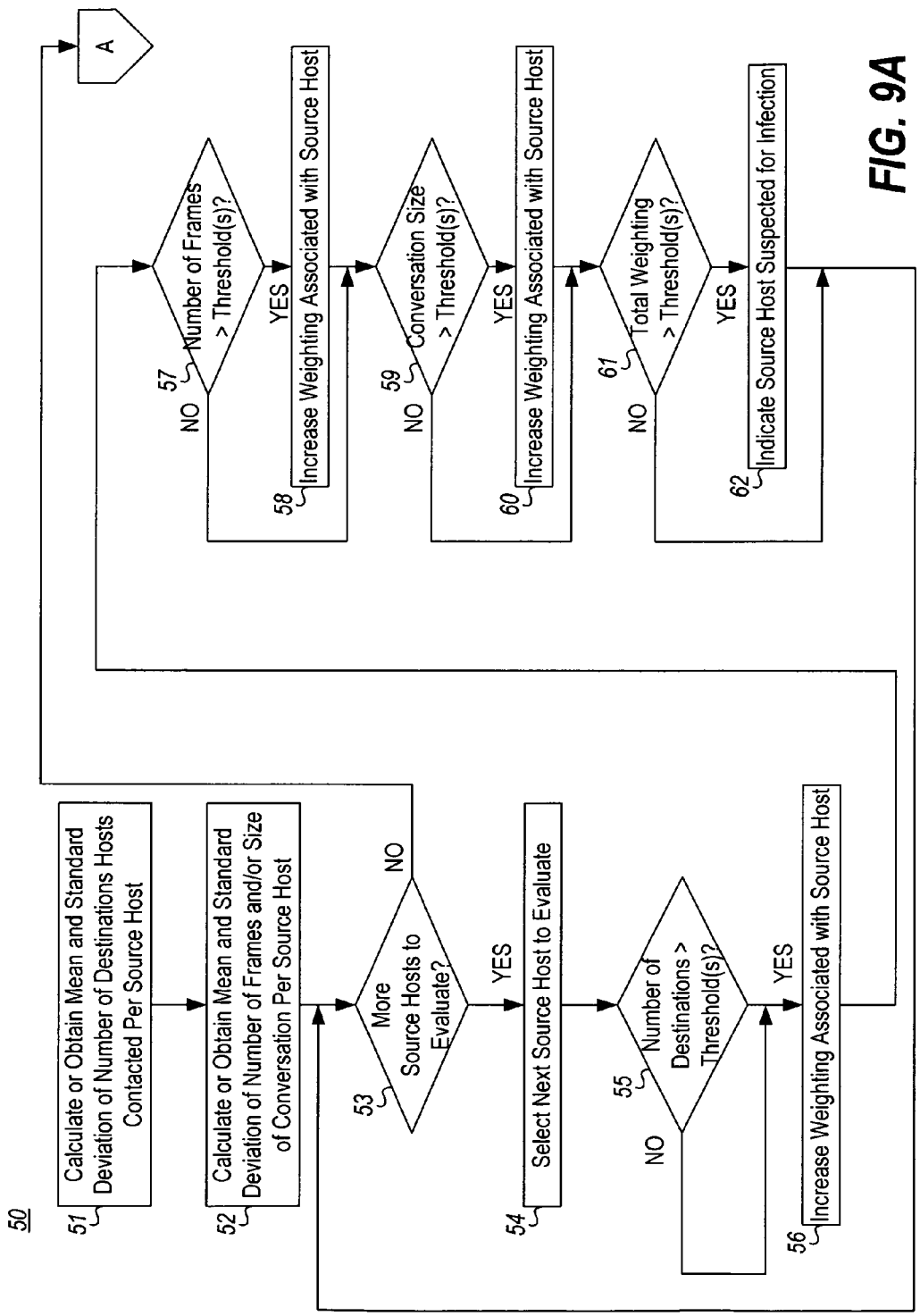
FIGS. 9A and 9b illustrate an exemplary ranking algorithm for indicating suspected infected nodes in an enterprise network.
Figure 9B:
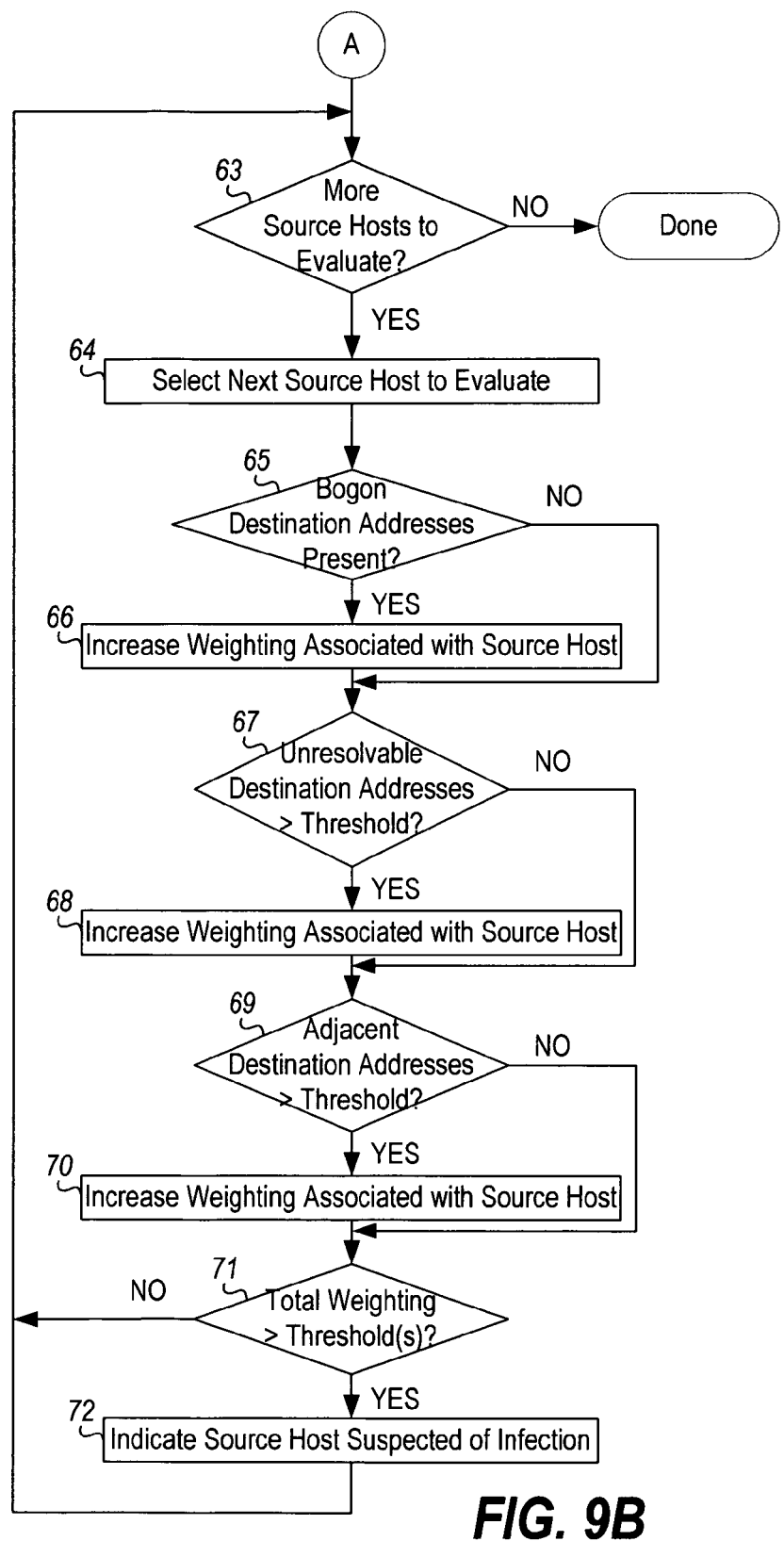

FIGS. 9A and 9B illustrate an example ranking algorithm 50. Various statistics can be calculated from the information contained in the traffic conversation information matrix 40. The ranking algorithm 50 utilizes factors such as number of destination hosts that are contacted by each of the source hosts, the number of frames the conversation is divided into, and the size (e.g., in terms of bytes) each conversation includes to perform an initial screening of source hosts suspected of infection. The ranking algorithm 50 thus calculates or otherwise obtains the mean and standard deviation for the number of destination hosts contacted per source host (step 51) and the mean and standard deviation of either or both of the number of frames per conversation and conversation size per source host (step 52). Since the traffic conversation information matrix 40 represents traffic over the entire enterprise network, the above data (e.g., mean and standard deviations collected in steps 51 and 52) provides an idea of what is considered "normal" traffic conversation for a particular service (identified by the port/protocol user for network communication) in the enterprise network of interest. Based on these statistics, certain weighting can be attributed to corresponding factors that are considered outside the "normal" range of these same factors across the entire enterprise network. Thus, thresholds, limits, and/or ranges (hereinafter, referred to simply as "threshold(s)") may be assigned to each factor and corresponding weights assigned to the various threshold values.

For each source-host in the traffic conversation information matrix 40 (determined and selected in steps 53 and 54), the ranking algorithm 50 determines whether the number of destinations contacted by the source host exceeds one or more thresholds (step 55), and the total weight associated with the source host is increased by a weighting attributed to excessive number of destination hosts contacted (or attempted to be contacted) (step 56).

The ranking algorithm 50 also determines whether the variation in number of frames in the conversations from the source host exceeds one or more associated thresholds (i.e., are the number of frames in each conversation similar, which would be consistent with the behavior of aberrant code, or do they vary for the most part?) (step 57), and the total weight associated with the source host is increased by a weighting attributed to low variation in conversation frame number (step 58). The ranking algorithm 50 also determines whether the variation in conversation size from the source host exceeds one or more associated thresholds (i.e., are there many nearly identical sized conversations, which would be consistent with "scanning" or "probing" behavior of aberrant code, or do they vary for the most part?) (step 59), and the total weight associated with the source host is increased by a weighting attributed to low variation in conversation size (step 60).

At this point, the ranking algorithm 50 determines whether the total weighting exceeds a predefined weight threshold (step 61) which indicates that the source host is suspected of infection (step 62).

Once the first pass of source host evaluation has been completed (steps 53 through 62), the source hosts suspected of infection are subjected to a further analysis (in steps 63 through 72). To this end, for each source host in the traffic conversation information matrix 40 that is suspected of infection (determined and selected in steps 63 and 64), weight is added to each of the suspected infected source hosts having bogon destination addresses (steps 65 and 66), unresolveable destination addresses (steps 67 and 68), and adjacent destination addresses (steps 69 and 70). After accumulating the weightings attributed to each of these factors for each of the suspected source host nodes, those suspected source host nodes having a total weighting greater than a predetermined threshold (determined in step 71) are indicated as highly suspect as infected with aberrant code (step 72).

In general, the ranking is performed based on weights assigned to given factors. The more identifying factors a source has, the greater the weight attributed to it. The higher the weight attributed to a given source host, the stronger the likelihood that the source host node is infected with aberrant code.

An example scoring criteria for assigning weights to source hosts is as follows:

```
#############################################################

# Scoring Criteria (scale of 0 to 100)

#   Primary Analysis:

# Number of destinations exceed 1 standard deviation over mean: set
#         initial weight to 25
# Number of destinations exceed 3 standard deviations over mean: add 20
# Both Frames and Bytes standard deviation <= 5%: add 5

#   Secondary Analysis:

# "bogon" destination addresses are present: add 25
# Unresolveable destination addresses to names exceeds 20%: add 15
# Adjacent destination addresses exceed 10%: add 10

#############################################################
```

Note that the "unresolveable destination addresses to names" could also be "Destination is not also an observed source" in traffic conversation information matrix 8. The goal here is to try to identify destinations that do not appear to be valid, active hosts. The weighting is cumulative; if a source host meets all these criteria, it receives a score of 100 (i.e., a 100% weighting).

Once infected nodes are identified, further analysis may be performed over successive analysis periods to determine which nodes infect others. Targets of infected nodes in an analysis period are matched to infected nodes in the next analysis period, creating a "chain" of infected, attacked, and infected hosts. This analysis allows visualization of an actual infection vector through a network—showing where an infection entered an enterprise network, and how it spread. This information can highlight areas of investment required for security infrastructure or consulting.

Figure 10:
FIG. 10 is an example directory and file structure for storing information related to detected infected hosts.

FIG. 10 is an example file structure for storing information related to detected infected hosts which may be useful for visualization of an outbreak of aberrant code across an enterprise network and for post-detection analysis. As illustrated, a top level directory called "/infected" stores subdirectories, one for each analysis period "/intervalA", "intervalB", . . . , "intervalN". Each analysis period subdirectory includes a file called "infected". The "infected" file contains a list of the source IP address of each suspected infected node detected during a primary analysis during the analysis period identified by the corresponding subdirectory. Each line of the "infected" file for a given analysis period may comprise the fields: source|count|bytes|frames|port, where "|" is the field separator, "source" is an infected host, "count" is the number of targets attacked by this host during this analysis period, "bytes" is the observed traffic in bytes by this server for this host during this analysis period, "frames" is the observed traffic in frames by this server for this host during this analysis period, and "port" is the protocol port ID.

Each analysis period subdirectory also includes a file named "xxx.xxx.xxx.xxx.targets" for each source IP address xxx.xxx.xxx.xxx contained in the "infected" file. The "xxx.xxx.xxx.xxx.targets" file contains a list of the destination IP addresses targeted by the source IP address identified by the address "xxx.xxx.xxx.xxx" in the name of the corresponding "xxx.xxx.xxx.xxx.targets" file. Each line of a given "xxx.xxx.xxx.xxx.targets" file may comprise the fields: destination|frames|bytes|averageFrameSize, where "|" is the field separator, "destination" is a target attacked by the infected host, "frames" is the number of frames observed for this target from the host xxx.xxx.xxx.xxx by this server for this analysis period, "bytes" is the number of bytes observed for this target from the host xxx.xxx.xxx.xxx by this server for this analysis period, and "averageFrameSize" is the bytes/frames for this traffic pair.

Case Study: Application of Invention to Detect and Visualize Worm

The present invention was used to detect and visualize infection of a given enterprise network by a known worm. In this implementation, Inmon® Traffic Servers deployed in the enterprise network provided both real-time and historical data. Real-time data was visualized with Java® servlets that display traffic conversation in several formats, with one-minute resolution. Data was also available through HTTP queries to the server, in one-hour resolution. The Inmon® Traffic Servers provided the traffic conversation information matrix of source hosts and destination hosts that they communicated with, along with some protocol and traffic volume information about the conversations themselves.

To identify suspected infected hosts, recent historical data was extracted, subjected to the primary analysis (step 38) shown in FIG. 8, and the suspected infected hosts identified by the primary analysis 38 were subjected to the secondary analysis (step 39) shown in FIG. 8.

The primary query to the sample collector (through the InMon® Traffic Server) was for sources of traffic destined to TCP port 445, and for the number of destinations that they contacted over the analysis period. An adaptive baselining function implemented according to U.S. Pat. No. 6,182,022, supra, was applied to the collected data (i.e., the traffic conversation information matrix) to determine what was considered normal behavior for nodes in this enterprise network sourcing traffic destined to TCP port 445. The "normal" behavior for this particular traffic conversation factor was used as a baseline of comparison to identify sources that communicated with an "unusually" large number of destinations over the analysis period. These hosts were identified as "suspected infected" nodes, and were subjected to the secondary analysis of analyzing the destinations they attacked.

In the secondary analysis of the destinations attacked by the suspected infected hosts, anomaly analysis was performed with the focus on searching for several characteristic behaviors of aberrant code, including whether some of the destinations a suspected infected host attempted to communicate with were "bogons", whether some of the destinations a suspected infected host attempted to communicate with were active IP addresses within the enterprise network but not resolvable in DNS, and how many of the destination addresses that a suspected infected host attempted to communicate with Were adjacent in the address space.

One of the advantages of the aberrant code detection technique of the invention is that while an individual analysis of each of the factors might not produce accurate results, when considered together, this technique can produce highly reliable results. As an infection becomes more acute, the behavior of infected nodes actually becomes more obvious in comparison to normal, benign traffic. Hence, the worse the infection, the more reliable the results of the analysis. However, it is important to note that the adaptive baselining function produces results which are relative to normal behavior, and not results which exceed pre-defined threshold values. In the case study, the worm outbreak was initially examined using a real-time analysis which performed the analysis of the invention in real-time, for an individual interval on a single server.

The traffic conversation information matrix was processed to calculate the number of destinations communicated with over the analysis period by each source. Those sources that exceeded a "normal" number of destinations were identified as "suspected infected". The total observed activity, in bytes, could be viewed, as well as the most typical size of an individual conversation. As learned, for all the hosts identified as infected, the typical size of a conversation is very similar, as is the average frame size within the conversation. This knowledge was useful to help validate that a similar piece of code was producing roughly identical results from a large number of sources. Because the data was collected on distant conversations that passed through the enterprise network instrumentation, there was not always sufficient data to fully characterize the conversations; however, the occurrence of the conversation itself was reliably detectable, and that contributed to the accuracy of the primary analysis.

The secondary analysis in real-time allows examination of the characteristics of the destinations that were being attacked by the "suspected infected" sources. From the secondary analysis it was found that the destinations were often roughly sequential and adjacent, and were often either clearly bogons, or did not resolve in DNS. Conversation sizes were also often also similar or identical.

Figure 11:
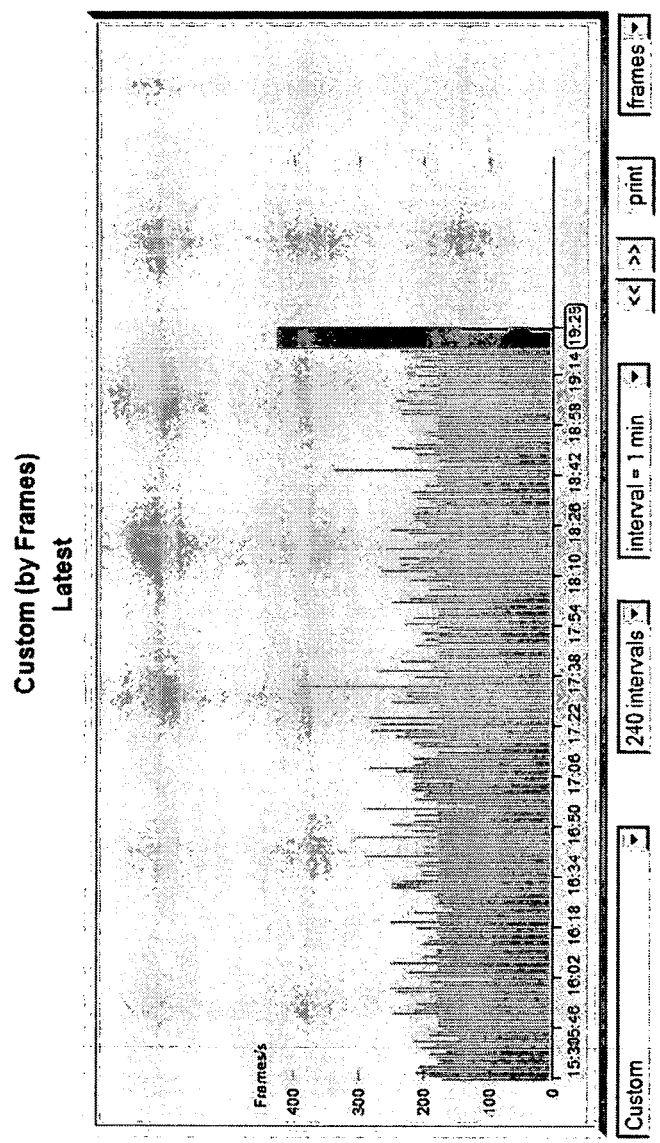
FIG. 11 is a graph illustrating the average number of frames in a conversation by host in the enterprise network in one-minute intervals over time during a portion of the life of an example worm outbreak incident.

When hosts identified using the two-step aberrant code analysis technique of the invention were observed with the monitoring function of the InMon® Traffic Server, a typical infected host would appear as shown in FIG. 11. As shown in FIG. 11, the exemplary infected host was sending a continuous 200 frames/sec stream of data, and attacking destinations within the first octet of its own subnet on TCP port 445. Each one-minute interval, its top five destinations changed, meaning there were no real "conversations" lasting more than one minute. This is a worm infected host, caught in the act.

Figure 12:
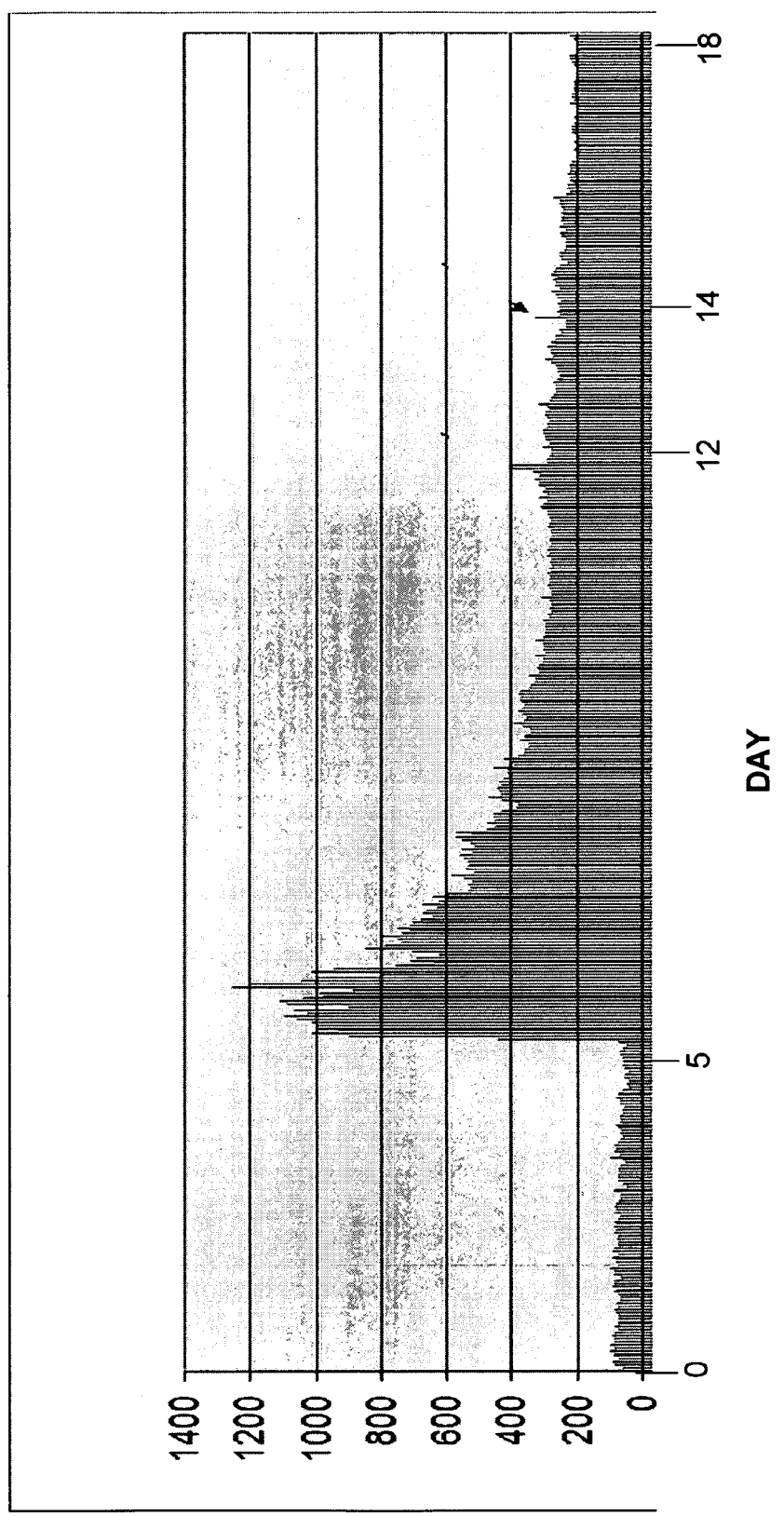
FIG. 12 is a graph of the number of discrete infected hosts visible within an example enterprise network in one-hour intervals over the life of the worm outbreak incident within the enterprise network.

The same technique was used to examine suspected infected hosts and their destinations over a 19-day period bracketing the worm outbreak incident. The graph in FIG. 12 shows the number of discrete infected hosts visible within the enterprise network in one-hour intervals over the life of the worm outbreak incident. The analysis was begun on day 0, to baseline the level of "unusual" traffic identifiable on TCP port 445. The onset of the worm outbreak incident within the enterprise network is dramatic and very visible on day 4.

The graph in FIG. 12 is useful to help to understand how rapid and effective the remediation efforts taken were once the infection was discovered. The ability to visualize the incident in this way allows one to extract some interesting information about the system, including the level of infection at any given time within the historic period of analysis, when the infection was introduced, how effective any steps taken to remediate the infection are over time, and whether and when any variants of the infection are introduced into the enterprise network. For example, the data of the graph in FIG. 12 shows that even after two weeks from the onset of the worm outbreak incident on day 4, the baseline "noise" level of TCP port 445 activity is greater at over 200 infected hosts than the pre-incident activity at less than 100 infected hosts. This suggests that the remediation steps are not 100% effective. At least two distinct "spikes" are visible several days into the incident, on day 12, and on day 14, perhaps corresponding to the release of variants of the worm, or a "re-flash" of vulnerable systems. Network impact peaked at 8 gigabytes per hour, but rapidly settled to less than 1 gigabyte per hour, finally tapering off to about a half a gigabyte per hour.

Figure 13:
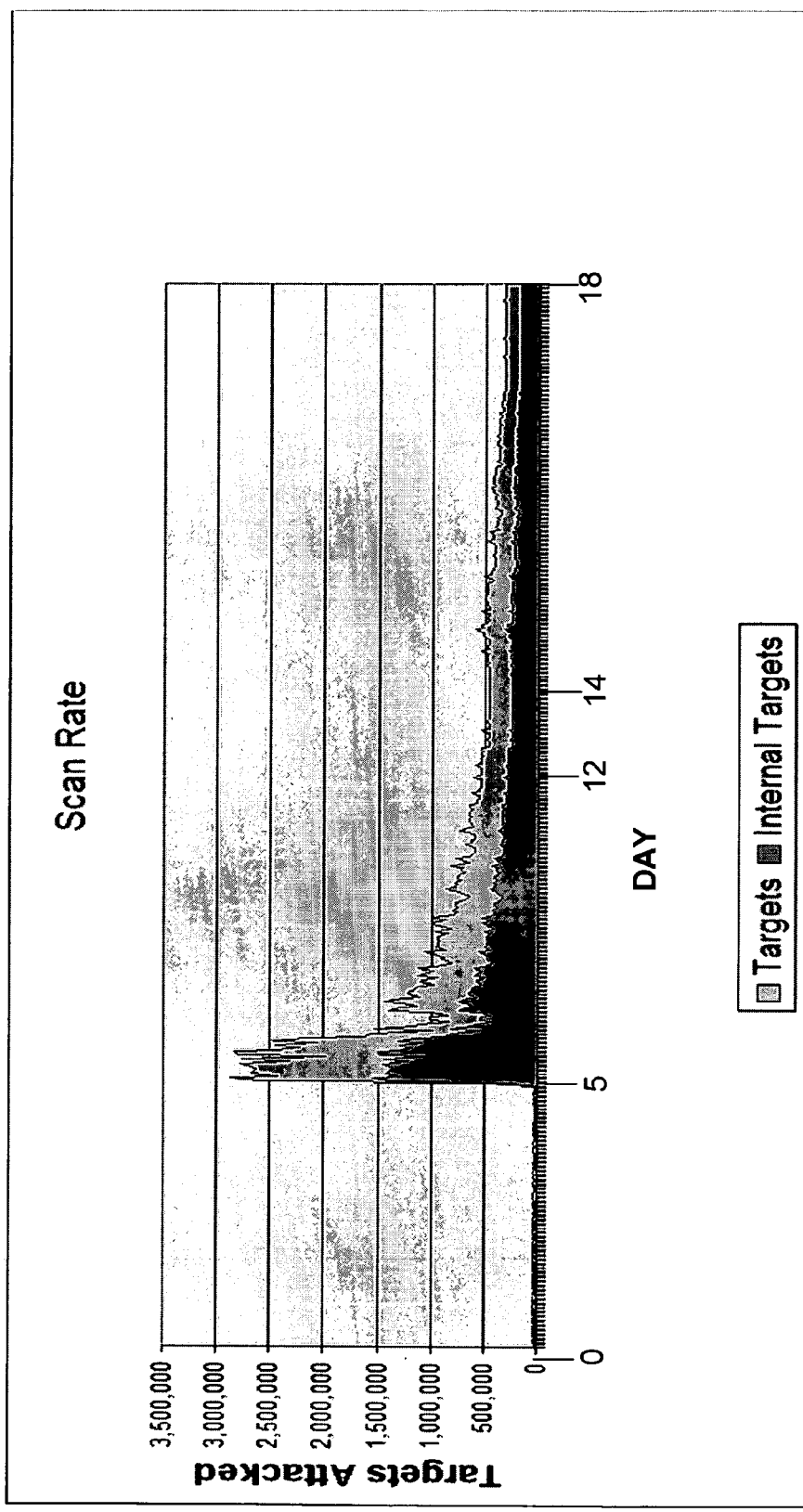
FIG. 13 is a graph of the number of discrete targets attacked by infected hosts from the example enterprise network in one-hour intervals over the life of the worm outbreak incident within the enterprise network.

The graph in FIG. 13 shows the number of discrete targets (destination hosts) attacked by the worm infected hosts in one-hour intervals over the life of the worm outbreak incident. From this graph, the "effectiveness" of the worm propagation algorithm can be examined by analyzing the targets attacked to determine whether they were internal to the enterprise network or external to the enterprise network. The level of certainty that the hosts are infected by the worm can be validated by comparing this graph to what is known about worm's scanning algorithm. Clearly, from the onset of worm through the end of the analysis period, suspected infected hosts attack internal targets about 50% of the time, and external or bogus targets about 50% of the time. This matches the independent analysis of worm's propagation algorithm.

The present invention can be used to detect the source of infection of an enterprise network. To this end, if the network initially becomes infected during any given analysis period, then it will be apparent that the first node (or nodes) to become infected in the network during that period were the source node(s) of infection. Alternatively, if traffic conversation information is continuously collected and monitored over successive analysis periods, sources of introduction of infection by aberrant code can be identified by performing further analysis on successively previous analysis periods when an infected node is identified using the aberrant code detection technique of the invention. FIG. 14 illustrates an exemplary such method for identifying source(s) of infection in an enterprise network. As shown in FIG. 14, the enterprise network is continuously monitored using the aberrant code detection technique of the invention (step 81) to detect infected node(s). When an infected node is detected in a given analysis period (step 82), then successive previous analysis periods are analyzed using the aberrant code detection technique of the invention. In particular, a current infected node variable is set to the detected infected node (step 83) and the traffic conversation information for the next successive previous analysis period is obtained (step 84). For each source host in the traffic conversation information obtained in step 84 that attempts to contact the current infected node as a destination host, the aberrant code analysis technique of the invention is performed to determine whether the respective source host is infected (step 85). If the analysis in step 85 reveals that none of the source hosts that attempts to contact the current infected node as a destination host are identified as possibly infected (step 86), the source of infection of aberrant code for the enterprise network is determined to be (or is highly likely) the initially detected infected node (as identified in step 82) itself. The infection source is set to the current infected node (step 87) to reflect this.

If, however, the analysis in step 85 reveals that a source host that attempts to contact the current infected node as a destination host are identified as possibly infected (step 86), the current infected node variable is set to the infected source host (step 88), and steps 84 through 88 are repeated until the analysis in step 85 uncovers no infected source hosts. The determination step 86 then passes to step 87, whereby a source of infection of aberrant code for the enterprise network is identified as the current infected node. Steps 84 through 88 are repeated recursively in each pass for each source host that attempts to contact the current infected node as a destination host. Therefore, there may be returned multiple infection sources. The infection source from the earliest analysis period is selected as the true source of infection if multiple infection sources are returned. Accordingly, a "chain" of infected, attacked, and infected hosts can be recreated from the traffic conversation information of successive analysis periods. It will also be apparent that if the historical data is available, the traffic conversation information matrices over successive analysis periods can be combined to form a larger traffic conversation information matrix over an extended analysis period. The two-stage analysis of the invention may then be performed on the overall matrix to determine the first node (or nodes) to become infected in the network, indicating the source node(s) of infection. The analysis can be used not only to identify the source of infection but may also be graphically captured to allow visualization of an actual infection vector through a network—showing where an infection entered an enterprise network, and how it spread. This information can highlight areas of investment required for security infrastructure or consulting.

As can be appreciated from the above detailed description, the present invention is advantageous for numerous reasons. As described, no predefined signature library is required since the technique of the invention analyzes behavior rather than matching against signatures. Accordingly, novel infections can be detected based solely on traffic conversation behavior. This means that new aberrant code can be detected immediately rather than awaiting for notification and updated signatures from virus scanning vendors. In addition, false positive indications are significantly reduced—the aberrant code analysis of the invention objectively evaluates the direct indications of propagation. Accordingly, the more effective the propagation of the aberrant code, the more positive the indication of infection. The data collection used by the invention operates at media speed with data provided from the switch fabric, and is very robust under heavy load. Furthermore, the invention does not require specialized, dedicated sensor hardware. Mixed-mode, multiple propagation vectors—communication over several ports or protocols from a single instance of aberrant code—can be easily correlated and identified. Finally, extending the analysis period over a longer time frame can identify "stealthy" aberrant code that propagates slowly.

Those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A method, comprising:
   obtaining a first plurality of values representative of data transported via respective ones of a plurality of traffic conversations within an enterprise network during an analysis period;
   computing, via a processor, a statistical attribute of the first plurality of values;
   computing, via the processor, a threshold based on the computed statistical attribute;
   comparing the first plurality of values to the computed threshold to identify a subset of nodes of the enterprise network suspected of including aberrant code; and
   identifying from the subset of nodes a first node as including the aberrant code based on a second plurality of values characterizing destinations contacted by respective ones of the subset of nodes.

2. The method of claim 1, wherein the threshold represents at least one of a number of attempted contacts, a number of frames per conversation, or a variation in conversation size.

3. The method of claim 1, further comprising analyzing a portion of the first plurality of values associated with the first node to confirm presence of the aberrant code on the first node.

4. The method of claim 1, wherein the second plurality of values represents at least one of a first number of attempted contacts with destination hosts in an adjacent address space, a second number of attempted contacts with bogons, or a third number of attempted contacts with destination hosts having unresolvable destination names.

5. An article of manufacture comprising a tangible computer-readable storage medium excluding propagating signals and storing machine-accessible instructions that, when executed, cause a machine to at least:
   obtain a first plurality of values representative of data transported via respective ones of a plurality of traffic conversations within an enterprise network during an analysis period;
   compute a statistical attribute of the first plurality of values;
   compute a threshold based on the computed statistical attribute;
   compare the first plurality of values to the computed threshold to identify a subset of nodes of the enterprise network suspected of including aberrant code; and
   identify from the subset of nodes a first node as including the aberrant code based on a second plurality of values characterizing destinations contacted by the first node.

6. The article of manufacture of claim 5, wherein the threshold represents at least one of a number of attempted contacts, a number of frames per conversation, or a variation in conversation size.

7. The article of manufacture of claim 5, wherein the second plurality of values represent at least one of a first number of attempted contacts with destination hosts in an adjacent address space, a second number of attempted contacts with bogons, or a third number of attempted contacts with destination hosts having unresolvable destination names.

8. An apparatus, comprising:
   a data collector to obtain a first plurality of values representative of data transported via respective ones of a plurality of traffic conversations within an enterprise network during an analysis period;
   a statistical analyzer to compute a statistical attribute of the first plurality of values;
   a source profiler to compute a threshold based on the computed statistical attribute, and compare the first plurality of values to the computed threshold to identify a subset of nodes of the enterprise network suspected of including aberrant code; and
   a destination analyzer to identify from the subset of nodes a first node as including the aberrant code based on a second plurality of values characterizing destinations contacted by respective ones of the subset of nodes, wherein at least one of the data collector, the statistical analyzer, the source profiler or the destination analyzer is implemented with hardware.

9. The apparatus of claim 8, further comprising an anomaly analyzer to analyze a portion of the first plurality of values associated with the first node to confirm presence of the aberrant code on the first node.

10. The apparatus of claim 8, wherein each of the second plurality of values represents at least one of a first number of attempted contacts with destination hosts in an adjacent address space, a second number of attempted contacts with bogons, or a third number of attempted contacts with destination hosts having unresolvable destination names.

11. The method of claim 1, wherein the statistical attribute comprises at least one of a mean or a standard deviation of the first plurality of values.

12. The article of manufacture of claim 5, wherein the statistical attribute comprises at least one of a mean or a standard deviation of the first plurality of values.

13. The apparatus of claim 8, wherein the statistical attribute comprises at least one of a mean or a standard deviation of the first plurality of values.

14. The apparatus of claim 8, wherein the threshold represents at least one of a number of attempted contacts, a number of frames per conversation or a variation in conversation size.

15. The method of claim 4, further comprising:
   setting a weight associated with the first node to an initial amount;
   increasing the weight by a first amount when the second number is non-zero;
   increasing the weight by a second amount when the first number exceeds a second threshold; and
   increasing the weight by a third amount when the third number exceeds a third threshold.

16. The method of claim 1, further comprising identifying the first node as having the largest associated one of the second plurality of values.

* * * * *